UNITED STATES PATENT OFFICE.

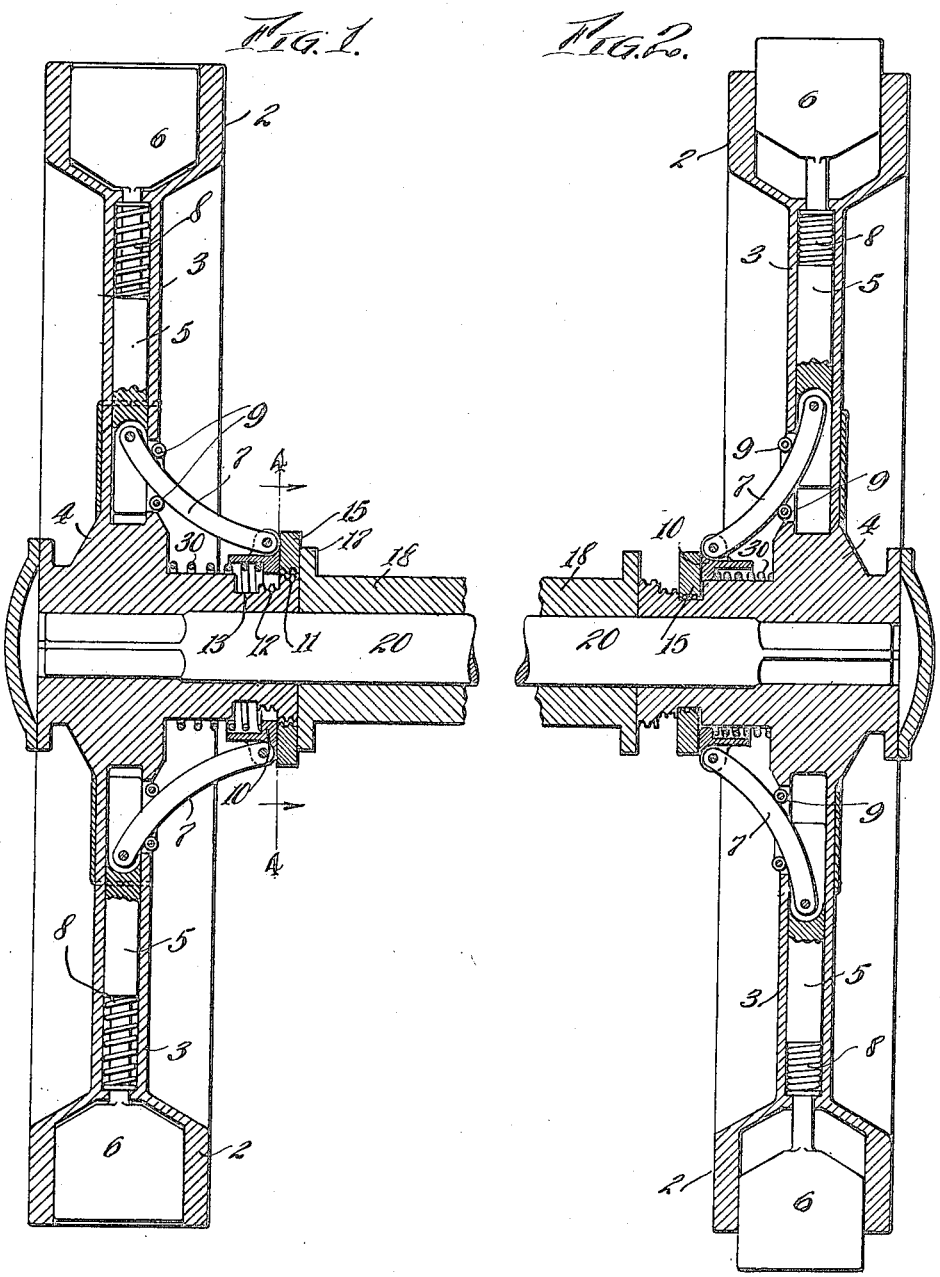

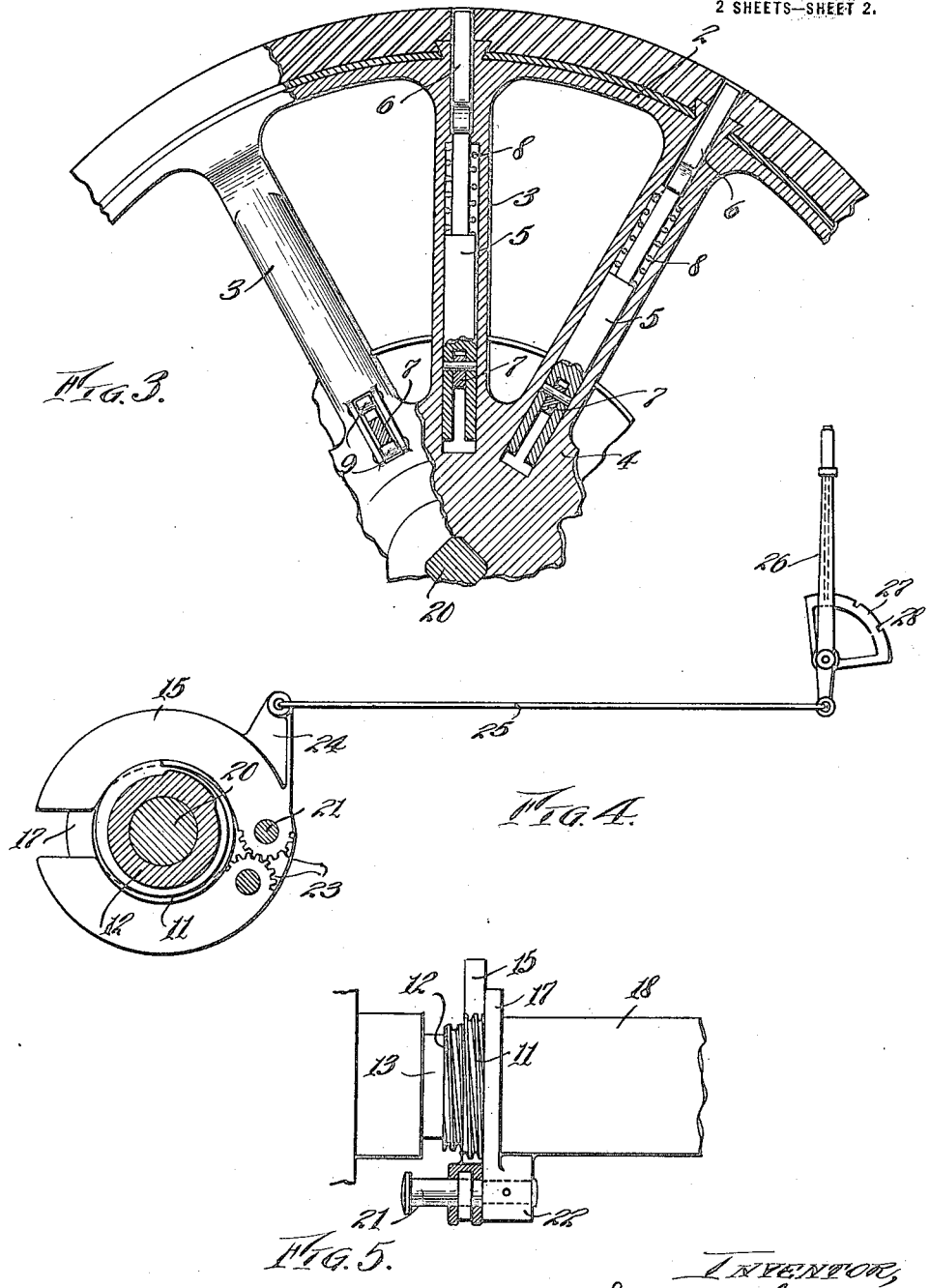

CHARLES SWAN, OF CLEVELAND, OHIO.

TRACTION DEVICE.

1,372,787.     Specification of Letters Patent.     Patented Mar. 29, 1921.

Application filed January 12, 1920. Serial No. 350,915.

*To all whom it may concern:*

Be it known that I, CHARLES SWAN, a citizen of the United States, residing at Cleveland, in the county of Cuyahoga and State of Ohio, have invented certain new and useful Improvements in Traction Devices, of which the following is a specification.

This invention relates to an improvement in traction devices and is particularly adapted for use in connection with agricultural implements although it may with slight modifications be readily adapted to use on commercial vehicles.

The particular object of the invention is to provide a means whereby traction may be obtained whenever necessary and without undue labor on the part of the operator of the vehicle, these means being so constructed as to be semi-automatic in action, and so constructed that when not in operative position they will not mutilate the highways over which it is sometimes necessary to travel.

Still further objects of the invention are in the provision of means which will be so constructed as to permit of easy replacement of broken parts, the provision of means whereby the traction elements may be extended or retracted at the will of the driver and from his seat, and the provision of means which will be simple and efficient in operation, cheap of manufacture, and capable of withstanding hard usage and a minimum of attention on the part of the user.

With these and other objects in view the invention consists in the construction and combination of parts hereinafter fully illustrated, described, and particularly pointed out in the following description and claims, reference being had to the accompanying drawings wherein like reference numerals designate similar parts throughout the various views and wherein:

Figure 1 is a vertical section through a wheel and a portion of its axle, the certain parts of my invention being embodied therein.

Fig. 2 is a similar view, the traction elements being shown in an extended or operative position.

Fig. 3 is a sectional elevation, taken at right angles to the preceding views.

Fig. 4 is a sectional detail on the line 4—4 of Fig. 1; and

Fig. 5 is a like detail on the line 5—5 of Fig. 4.

The invention consists of a wheel having the felly 2 spokes 3 and hub 4 cast in one piece. The spokes are cast hollow and inclose the stems 5 of the traction elements or spurs 6 and said spurs are inclosed in suitable recesses in the felly, from which they may be extended as shown in Fig. 2 to provide gripping projections in a manner to be hereinafter described. The stems 5 are forked at their inner ends sufficiently to allow links 7 to be pivoted therein and compression springs 8 are inserted about a reduced portion of the stems to normally hold the spurs 6 in retracted position, as shown in Fig. 1. The aforementioned links 7 pass through openings in the inner ends of the spoke and between pairs of anti-friction rollers 9 carried at the inner and outer ends of said openings and are pivotally secured at their inner ends to a collar 10 which is pressed outwardly by a compression spring 30 mounted upon the hub 4 and which assists the springs 8 in maintaining the spurs 6 in their retracted position.

It will be noted that the hub 4 is provided with three portions of varying outside diameters, the portions 11 and 12 being provided with an external thread and the portion 13 being smooth finished. A split nut 15 provided with an internal thread is mounted upon said stepped portions and between the collar 10 and a flange 17 of the axle housing 18 within which is placed the driving axle 20.

The aforementioned nut 15 is prevented from rotation but is allowed to move longitudinally along the hub by being mounted upon a stud 21 securely fixed in a boss 22 formed as part of the axle housing 18 and at the point where the nut is split it is provided with gear segments 23 whereby an equal movement of each half of the nut may be had, thus it will be apparent that the upper half of the nut is supported upon the threaded portion of the hub, and that the lower half is prevented from dropping through the engaging teeth of the gear segments 23.

The upper half of the nut is provided with a vertical ear 24 which is connected by a cable or rod 25 with an operating lever 26, and said lever 26 is provided with a sector 27 provided with notches 28 and said notches are so placed that when the lever 26 is moved about the sector the notches will correspond to the various steps on the hub 4.

In operation when it is desired to extend the traction elements to provide gripping spurs the lever 26 is moved until the teeth from the nut 15 engage the teeth on the largest threaded portion of the hub and the rotation of the wheel causes the nut to move longitudinally and inwardly upon said hub. As it travels it thrusts against the collar 10 and this thrust is transmitted to the stems 5 through the links 7 and forces the spurs outwardly. The travel continues until the nut reaches the intermediate threaded portion of the hub where it may be arrested by freeing the nut from the threaded portion. This places the spurs 6 just outside of the felly 2. If it is desired to move the spurs to their extreme projected position the nut is allowed to continue its travel upon the intermediate portion of the hub until such time as it drops to the smallest or unthreaded portion where it is allowed to rest. When the nut is opened and disengaged, the springs return the parts to original position.

While I have shown and described this particular arrangement of parts it is obvious that various modifications may be had thereof and I do not wish to limit myself in the construction of the same further than is required by the state of the art or that which comes within the scope of the appended claims.

I claim:

1. The combination with a wheel and radially movable traction spurs carried thereon, of means to advance the spurs when desired, comprising screw threads on the hub of the wheel, an axially traveling nut movable into and out of engagement with said threads and operatively connected to said spurs, and means to operate the nut.

2. The combination with a wheel having a hub, of radially movable traction spurs carried on the wheel, a collar movable axially on the hub, links connecting the collar and spurs and adapted to advance the spurs when the collar is shifted inwardly, and means to so shift the collar, said means comprising screw threads on the hub, a sectional nut the sections of which are movable into and out of engagement with said threads and bearing against the collar, and means to operate the nut.

3. The combination with a wheel having a stepped hub, and radially movable traction spurs carried by the wheel, of a collar slidable axially on the hub and connected to the spurs to advance or retract the same, and means to shift the collar axially said means being engageable with the steps on the hub to hold the collar in desired position.

4. The combination of a wheel having a stepped hub provided with screw threads adjacent the steps, radially movable traction spurs carried by the wheel, a collar shiftable axially on the hub, links connecting the collar and the spurs, a sectional nut supported adjacent said hub and movable into and out of engagement with said threads and steps and bearing against the collar to shift the same inwardly when engaged with said threads.

5. The combination of a wheel having a stepped hub provided with screw threads adjacent the steps, radially movable traction spurs carried by the wheel, a collar shiftable axially on the hub and connected to the spurs to advance or retract the same, an axle housing adjacent the wheel, a nut segment pivoted to the housing and movable axially along the hub and bearing against the collar to force the same inwardly, means to swing said segment into and out of engagement with said threads and steps, and a spring to shift the collar outwardly when said nut segment is disengaged.

In testimony whereof, I do affix my signature in presence of two witnesses.

CHARLES SWAN.

Witnesses:
JOHN A. BOMMHARDT,
ROBERT L. BRUCK.